Dec. 28, 1937. B. L. GATES Re. 20,603
REFRIGERATING SYSTEM AND CONTROL MECHANISM THEREFOR
Original Filed Oct. 15, 1927
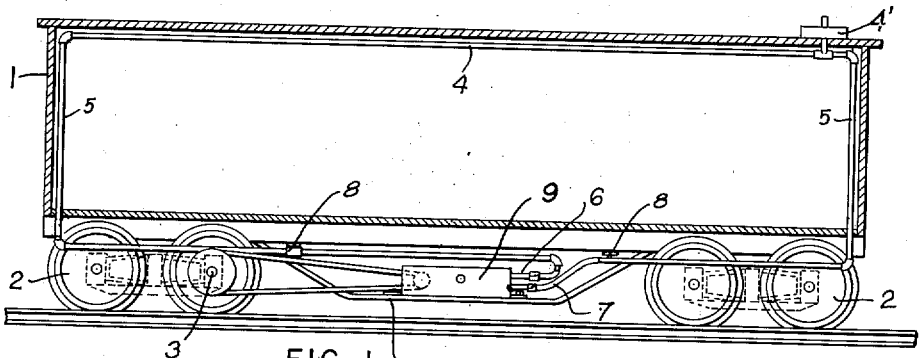
FIG.-1
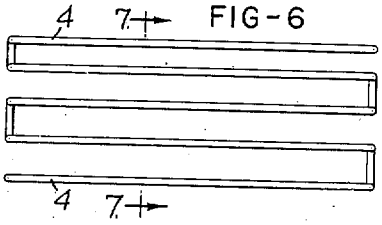
FIG-6
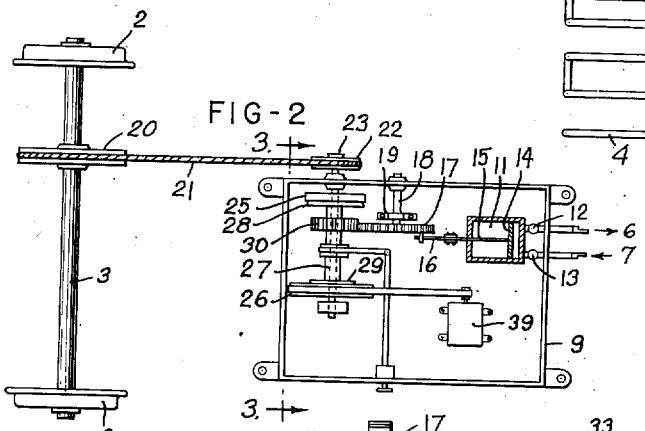
FIG-2
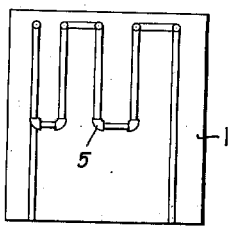
FIG-7
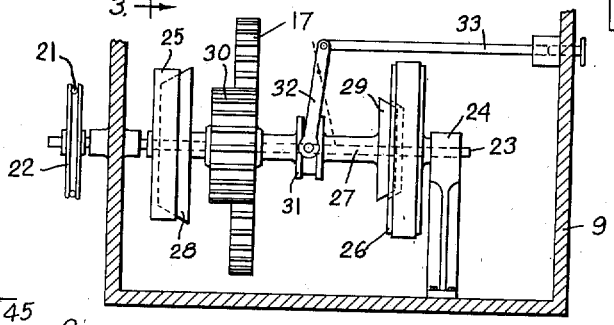
FIG-3
FIG-5
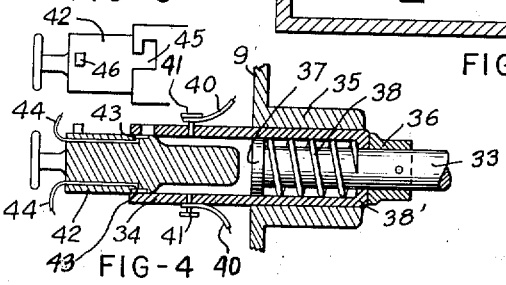
FIG-4
INVENTOR
BENJAMIN L. GATES
BY:- Cox x Moore
ATT'YS Reissued Dec. 28, 1937 Re. 20,603

UNITED STATES PATENT OFFICE 20,603

REFRIGERATING SYSTEM AND CONTROL MECHANISM THEREFOR

Benjamin L. Gates, Spokane, Wash., assignor of one-half to H. Luella Beamish, Spokane, Wash.

Original No. 1,827,981 dated October 20, 1931, Serial No. 226,341, October 15, 1927. Application for reissue October 9, 1933, Serial No. 692,909

31 Claims. (Cl. 62—117)

My present invention relates to an improved refrigerating system of the type employing a liquid refrigerant and means for circulating the refrigerant, and is especially adapted for use in refrigerating cars for railroads.

In carrying out my invention the circulation of the refrigerant is accomplished while the railroad car is in motion through the instrumentality of a pump that is actuated or driven through connections with an axle of the car. While the car is not in motion, as when on a siding, at a terminal, or in a switch yard, an electric motor is employed to operate the pump, the motor being connected up to the power line in the yard or terminal in the usual manner.

One of the objects of my invention is to provide means for actuating the operative unit of the refrigeration system for the railway car through mechanical power transmitting means operable by the rotary movement of the axle of the car, or alternatively, through a second power transmitting means operable only from an outside source of electric power, as, for instance, when the car is stationary any length of time, or is on a siding.

Other objects of my invention consist in certain other novel combination and arrangement of parts involving the location of the cooling coils of the refrigeration system in the cooling compartment of the railway car and the operation of the operative unit of the system selectively by either the axle of the car or by an electric motor, which, in turn, is operated from an independent outside source of electric power in a manner such that the axle drive is operatively disconnected when the outside source is used and vice versa.

In the accompanying drawing I have illustrated one complete example of the physical embodiment of my invention wherein the parts are combined and arranged according to the best mode I have thus far devised for the practical application of the principles of my invention.

Fig. 1 is a sectional view showing the interior of a railroad car equipped with the refrigerating system of my invention;

Fig. 2 is a plan view with some parts in section showing the pump or operative unit of the system of the reciprocating type, the driving mechanism therefor, and the clutch control for use of the alternate electric motor drive;

Fig. 3 is an enlarged vertical sectional view at line 3—3 of Fig. 2;

Fig. 4 is an enlarged sectional detail view showing the control device for the clutch and combined therewith a circuit maker for the control of the electric motor when the latter is used to drive the pump or operative unit;

Fig. 5 is an exterior view showing the coacting parts of the circuit maker;

Fig. 6 is a plan view showing the coils for the refrigerant in the ceiling of the car, and Fig. 7 is a view, as at line 7—7 of Fig. 6 showing the arrangement of the refrigerant coils at one end of the car, the arrangement of the coils at the other end of the car of course being similar.

In Fig. 1 a typical refrigerating car is shown in section and indicated as a whole by the numeral 1. The wheels are designated as 2 and one of the axles 3 is used for transmitting power to the pump or operative unit that circulates the liquid refrigerant through the cooling coils 4 at the top of the car and the end coils 5, suitable provision being made at 4' in the top of the car for supplying the liquid refrigerant to the system of coils.

Under the car the supply pipe 6 and the return pipe 7 for the coils are arranged, and cut out valves 8 may be used whenever it is necessary or desirable to cut out the coils from the pump.

The supply and return pipes extend under the car and into the interior of a box or casing 9, supported on the underframing 10 of the railroad car, and the cylinder 11 of the reciprocating pump is located and properly supported within the box or casing.

The supply and return pipes 6 and 7 are connected at the same end of the pump cylinder and these pipes are provided respectively with check valves 12 and 13 opening away from and toward the cylinder to control the passage of the refrigerant as it is circulated through the coils by the pump.

Suitable cooling or condensing coils or other means may be located beneath the car, and included in the circulation system, for cooling the circulating refrigerant.

The pump is provided with the usual type of piston head 14 and stem 15, and the pitman 16 connected to the stem extends to and is pivotally connected with the driving crank-gear 17 on the gear shaft 18 that is journaled, parallel with the axle 3, in the box or casing 9, bearings as 19 being employed for the shaft as usual.

While the car is in motion, the pump may be operated from the rotating axle 3 which is equipped with a driving pulley 20 over which a cable 21 extends to the smaller pulley 22 that is fixed on a clutch shaft 23 journaled in bearings 24 parallel with the gear shaft and enclosed within the casing 9.

The clutch mechanism on the clutch shaft includes a pair of spaced clutch devices 25 and 26. Clutch 25 is rigid with and rotates with the clutch shaft. Clutch 26 is loose on the shaft and is connected by a belt drive with an electric motor 39. A clutch sleeve 27, loose on the clutch shaft and adapted to be slid or shifted longitudinally thereof, is provided with the respective cooperative clutch members as 28 and 29 of these two friction clutches. One of these clutches is designed to transmit power to the pump from the driving axle 3 and the other is designed to transmit power to the pump from the electric motor 39 enclosed within the box or casing, the use of the clutches of course being alternate, or selective.

The slide sleeve 27 is provided with a wide driving gear 30 that engages or meshes at all times with the gear 17 and transmits power to the pump from either the vehicle or car-drive or the motor drive. The clutch sleeve is also provided with the usual clutch spool 31, pivoted yoke 32, and clutch rod 33, the latter being used, as by a pull to engage the mechanical drive, and by a push to engage the electric drive for the pump.

When the clutch rod is pushed to operate the pump by the electric motor, a normally open circuit maker may be closed to cause operation of the motor and pump, and when the rod is pulled to disengage the motor clutch, by the same movement the control circuit for the motor is broken to stop the motor.

For this purpose there is provided a socket head 34 that is fixed to a sleeve 35 formed integral with or attached to one of the walls of the box or casing 9. The end of the rod 33 extends slidably into the socket head, and a collar 36 is fixed on the rod to prevent excess movement thereof. Within the socket the rod is fashioned with a circular head or end 37, and a spring 38 is interposed between the circular head and an end flange 38' of the socket head.

The electric motor 39 is provided with wires 40 leading to insulated terminals 41 on the socket head, and within the socket head is arranged a slide head or plug 42 having insulated contacts 43 and wires 44 that extend to the power line of a warehouse, terminal, or railroad yard. This slide head, through its contacts 43 makes contact with the terminals 41 to close the motor circuit and operate the motor after the plug is turned to locked position, and of course when the contacts and terminals are separated by reversing the turning movement of the plug the circuit is broken.

The slide plug is normally held projected from the socket head by the springs 38, but may be pushed therein and locked thereto through the use of the bayonet slot 45 of the head and the lug 46 on the plug. Thus, when the plug is pushed into the hollow socket head against the tension of spring 38 from the positions of Figs. 4 and 5, the lug is entered in the bayonet slot and when the plug is turned the latter is locked by the bayonet joint in the socket head with the circuit closed. The same pushing movement on the slide plug imparts movement to the clutch rod to disconnect the mechanical drive (if that clutch is connected) and to connect the clutch for the motor drive and operate the refrigerating system.

The clutch rod 33 may be detained by any suitable means to insure the holding of the clutches in their respective operative positions.

It is obvious that various changes may be made in the specific embodiment of the invention shown and described for purposes of illustration without departing from the spirit of the invention. Accordingly the invention is not to be limited to the precise embodiment shown and described, but only as indicated in the following claims.

Having thus described my invention, what I claim as new and desire to obtain by Letters Patent is:—

1. In a refrigerating system, the combination with a machine, of a car-axle driving mechanism and an electric-motor driving mechanism, a pair of clutch devices and transmission-mechanism between the driving mechanisms and machine, an electric circuit for the motor, a single control rod for the clutch devices, and a circuit maker operatively connected with said control rod for controlling the motor.

2. The combination with a clutch device and a motor, of a socket head, a clutch rod having a portion slidable within said socket head and spring-pressed with respect thereto, electric wires from said motor to said socket head, a push plug in the socket head having contact points for co-action with terminals of the electric wires, and means for locking the plug in the socket head whereby the rod may be pushed and the motor circuit closed.

3. The combination with a clutch device and a motor, of a socket head, a clutch rod having a flanged portion slidable within said socket-head and a spring interposed between the flanged portion and the socket-head, electric wires for said motor to said socket head and terminals for the wires, a push plug in the socket head having normally open contact points for co-action with terminals of the electric wires, and co-acting means on the socket head and push plug, whereby the rod may be pushed and a motor circuit closed.

4. In a vehicle, the combination with a refrigerating compartment, of cooling mechanism therefor, an operative connection between a rotating shaft of said vehicle and said cooling mechanism, means for disengaging said connection, secondary driving means for said cooling means, means for disengaging said secondary driving means, and connections between both of said disengaging means permitting connection of only one at a time.

5. In a mechanical refrigerating system for a railway car, the combination of an operative element in said system for effecting the operation thereof, a cooling coil in said system through which refrigerant is circulated by said operative element, said coil being located within the car, mechanical power-transmitting means operable by rotary movement of the axle of the car, a second power-transmitting means independent of said first-named power-transmitting means operable only from an outside source of electrical power, and means for selectively and operatively connecting the operative element in driving relation with either of said power-transmitting means.

6. In a mechanical refrigerating system for a railroad car, the combination of an operative element for effecting the operation thereof, a cooling coil in said system through which refrigerant is circulated by said operative element, said coil being located within the car, power transmitting means operable by rotary movement of an axle of the car, an electric motor, and adjustable means for selectively and alternatively connecting either the motor or the power transmitting means in driving relation with the operative element.

7. In a mechanical refrigeration system for a railroad car, the combination of an operative element in said system for effecting the operation thereof, a cooling coil in said system through which refrigerant is circulated by said operative element, said coil being located within the car, of power transmitting means operated directly by rotary movement of an axle of the car, an electric motor, and manually actuated means for bringing the operative element into operative driving relation with either said power transmitting means or said motor, said manually actuated means preventing operation of the operative element by said power transmitting means when the same is in operative driving relation with the motor and also preventing operation of the operative element by said motor when the operative element is in operative driving relation with the power transmitting means.

8. In a mechanical refrigerating system for a railroad car, the combination of an operative element in said system for effecting the operation thereof, a cooling coil in said system through which refrigerant is circulated by said operative element, said coil being located within the car, a rotary member driven from the car axle, an electric motor, shiftable means in driving relation with the operative element and adapted to be operatively connected to either the motor or rotary member, said shiftable means in one position being in driving relation with the rotary member and entirely disconnected from the drive of the motor and when shifted to another position being brought into operative relation with the driving means of the motor and entirely disconnected from said rotary member.

9. In a mechanical refrigerating means for a railway car, the combination with a pump for effecting circulation of a refrigerant through a cooling coil, of power transmitting means operated directly by rotary movement of an axle of the car, an electric motor, and manually actuated means for bringing the pump into operative driving relation with either said power transmitting means or said motor, said manually actuated means preventing operation of the pump by said power transmitting means when the same is in operative driving relation with the motor and also preventing operation of the pump by said motor when the pump is in operative driving relation with the power transmitting means.

10. In a mechanical refrigerating means for a railway car having an insulated body, the combination with a pump for effecting the circulation of a refrigerant through a cooling coil within the car, of a rotary member operated directly by the movement of the car, an electric motor, shiftable means in driving relation with the pump and adapted to be operatively connected to either the motor or rotary member, said shiftable means in one position being in driving relation with the rotary member and entirely disconnected from the drive of the motor and when shifted to another position being brought into operative relation with the driving means of the motor and entirely disconnected from said rotary member.

11. In a wheeled vehicle having a compartment to be cooled, the combination with a pump for circulating a refrigerant through a cooling coil, of means for actuating the said pump operative when the vehicle is in motion, a separate prime mover mounted on the vehicle and adapted to independently actuate said pump, and devices operable at will, for operatively disconnecting said pump from said first named means and operatively connecting the pump with said prime mover and vice versa, whereby the refrigerating system may be operated while the vehicle is stationary for pre-cooling the compartment thereof, and said system may be actuated while the vehicle is in motion to maintain cooling.

12. In a refrigerating system for a railway car, the combination with an actuatable machine, of cooling coils through which refrigerant is circulated by said machine, power transmitting means operated directly by the car axle, an electric motor, and manually actuated means for bringing the machine into operative driving relation with either said power transmitting means or said motor, said manually actuated means preventing operation of the machine by said power transmitting means when the same is in operative driving connection with the motor and also preventing operation of the machine by said motor when the machine is in operative driving relation with the power transmitting means.

13. In a refrigerating system for a railway car, the combination with a machine, of car axle driving mechanism and an electric motor driving mechanism, a shiftable gear member operatively connected with the machine and adapted to have clutching engagement with the car axle driving mechanism, and manually operable means for shifting said gear member to two different positions, said gear member in one of said positions being in clutching engagement with the car axle driving mechanism and disconnected from the electric motor driving mechanism, and in the other position being connected with the electric motor driving mechanism and entirely disconnected from the car axle driving mechanism.

14. In a refrigerating system for a railway car, the combination with an actuatable machine, of car axle driving mechanism, and an electric motor operable only from an outside source of electrical power, clutch means for connecting the actuatable machine selectively and alternatively with the car axle driving mechanism or electric motor, means forming a socket adapted to receive a plug for the purpose of connecting the motor to the external source of electric power, and a shiftable member shiftable with a portion of said clutch means to plug the socket against the entry of the plug when the machine is in driving relation with the car axle and to permit the entry of the plug in the socket when the machine is in driving relation with said motor.

15. In a refrigerating system for a railway car, the combination with an actuatable machine associated with the refrigerating system, of car axle driving mechanism, and an electric motor operable only from an outside source of electrical power, means for connecting the actuatable machine selectively and alternatively with the car axle driving mechanism or the electric motor, said motor having an electrical circuit adapted to be connected with the outside source of electrical power and including a contact, and means operable when the machine is connected with the car axle for preventing connection of the outside source of electrical power with the contact of said electrical circuit.

16. In a refrigerating system for a railway car, the combination with an actuatable device, of car axle driving mechanism therefor, an electrical motor operable only from an outside source of electrical power and including an electrical circuit, means for selectively and alternatively connecting the actuatable device with the car axle driving mechanism or the electric motor, and means operable when the device is connected with the car axle driving mechanism for preventing the energizing of the electrical motor.

17. In a mechanical refrigerating system for a railway car of the type having a refrigerating compartment, the combination of a cooling coil through which refrigerant is circulated for the purpose of cooling said compartment, an actuatable machine associated with said refrigerating system for circulating refrigerant through said coil, car axle driven mechanism, an electric motor and an electric motor driving mechanism, and means for drivingly connecting the actuatable machine with the car axle driven mechanism and with the electric motor, including devices for causing an automatic disengagement of one of said mechanisms when the other mechanism is drivingly connected with the actuatable machine.

18. In a mechanical refrigerating means for a railway car, the combination with a pump; of cooling mechanism including a circulating coil within the car having communication with said pump; mechanical power transmitting means operable by rotary movement of an axle member of the car; a second power transmitting means independent of said first named power transmitting means operable only from an outside source of electrical power; and means for selectively and operatively connecting the pump in driving relation with either of said power transmitting means.

19. In a mechanical refrigerating means for a railway car, the combination with a pump; of cooling means including a cooling coil within the car having communication with said pump; power transmitting means operable by rotary movement of an axle of the car; an electric motor; and adjustable means for selectively and alternatively connecting either the motor or the power transmitting means in driving relation with the pump.

20. In a mechanical refrigerating means for a railway car, the combination with a pump for circulating a refrigerant through a cooling coil; of a rotary member operated directly by movement of the car; an electric motor having a driving means; a shiftable gear member operatively connected to the driving means of the pump and adapted to have clutching engagement with said rotary member; and manually operated means for shifting said gear member to two different positions, said gear member in one of said positions being in clutching engagement with the rotary member and disconnected from the driving means of the motor, and in said other position being in driving relation with the driving means of the motor and entirely disconnected from the rotary member.

21. In a mechanical refrigerating system for a railway car, the combination with a pump for circulating a refrigerant through a cooling coil; of means for driving the pump from one of the axle members of the car; an electric motor for driving the pump when the car is standing still for pre-cooling purposes; a plug receiving socket electrically connected to the motor and adapted to receive the plug of a power line; manually operated means for operatively connecting the drive of the pump to either the car axle or the electric motor; and means controlled by the position of said manually operated means for closing the socket to render the same inoperative when the pump drive means is operatively connected with the car axle.

22. A refrigerating system for a vehicle comprising a cooling pipe, means for circulating refrigerant through said pipe, a member driven as an incident to the movement of the vehicle, a supplementary rotary power device operable when the vehicle is stationary, means for driving said circulating means from said driven member when the vehicle is moving, and means for driving said circulating means from the supplementary rotary power device when the vehicle is stationary.

23. A refrigerating system for a railway car comprising a cooling coil, means for circulating refrigerant through said coil, a member driven as an incident to the movement of the car, a supplementary electric motor, means for supplying electric power to said motor when the car is stationary, and means for driving said circulating means alternatively either from said driven member or from said electric motor.

24. A refrigerating system for a railway car comprising a cooling coil, means for circulating refrigerant through said coil, a member driven as an incident to the movement of the car, a supplementary rotary power device operable while the car is stationary, means for driving said circulating means alternatively either from said driven member or from said supplementary rotary power device, and means for disabling the driving connection between the circulating means and the driven member when the circulating means is being driven by the supplementary rotary power device.

25. A refrigerating system for a railway vehicle comprising a cooling coil, means for circulating refrigerant through said coil, a member driven as an incident to the movement of the vehicle, an electric motor operable from a source of electrical power, means for driving said circulating means alternatively either from said driven member or from said electric motor, said motor being electrically disconnected from said source of electrical power when the circulating means is being operated by said driven member.

26. A refrigerating system for a railway vehicle having a compartment to be cooled comprising a cooling coil for cooling said compartment, means for circulating refrigerant through said coil, a rotary member driven from the vehicle axle during transit of the vehicle, a supplementary rotary power device, and means including clutch mechanism for driving said circulating means alternatively from said rotary member when the vehicle is in transit and from the supplementary rotary power device when the vehicle is stationary.

27. A refrigerating system for a railway vehicle comprising a cooling coil, means for circulating refrigerant through said coil, a member driven as an incident to the movement of the vehicle, an electric motor, an outside source of electrical power, control mechanism for operatively connecting the motor to the outside source of electrical power, and means for driving said circulating means from said driven member when the vehicle is in motion and from the motor when the vehicle is stationary.

28. A refrigerating system for a railway vehicle comprising a cooling coil, means for circulating refrigerant through said coil, a member driven as an incident to the movement of the vehicle, an electric motor, an outside source of electrical power, control mechanism for operatively connecting the motor to the outside source of electrical power, means for driving said circulating means from said driven member when the vehicle is in motion and from the motor when the vehicle is stationary, and means operatively associated with said control mechanism for insuring the disabling of the connection between the circulating means and the driven member when the circulating means is being driven by the motor.

29. A refrigerating system for a vehicle comprising a cooling coil, means for circulating refrigerant through said coil, a member driven as an incident to the transit of the vehicle, an electric motor, an outside source of electrical power, control mechanism for operatively connecting the electric motor with said outside power source, means including a clutch for driving said circulating means from said driven member when the vehicle is in transit, means for driving said circulating means from said motor when the vehicle is stationary, and means operatively associated with said control mechanism for disabling the clutch when the circulating means is being driven from the motor.

30. The combination with a railway compartment to be cooled, of a refrigeration system comprising cooling coils operatively associated with said compartment to effect the cooling thereof, means for circulating refrigerant through said coils, car axle operated mechanism, and an electric motor mechanism, and transmission devices between the two mechanisms and the circulating means including clutch means for selectively and operably connecting the circulating means in operative driving relation with either of said mechanisms.

31. The combination with a railway compartment to be cooled, of a refrigeration system comprising cooling coils operatively associated with said compartment to effect the cooling thereof, means for circulating refrigerant through said coils, car axle driving mechanism, an electric motor, circuits for driving said motor from an outside source of electrical power, and means for operatively connecting the circulating means selectively and alternatively with the car axle driving mechanism or the electric motor.

BENJAMIN L. GATES.